United States Patent [19]

Wolf et al.

[11] 3,967,922

[45] July 6, 1976

[54] GRANULAR DYESTUFF PREPARATIONS BASED ON POLYVINYLALCOHOL AS THE CARRIER

[75] Inventors: Karlheinz Wolf, Leverkusen; Reinhold Hörnle, Cologne; Hans Künzelmann; Theodor Hild, both of Opladen, all of Germany

[73] Assignee: Bayer Aktiengesellschaft, Leverkusen, Germany

[22] Filed: Aug. 8, 1974

[21] Appl. No.: 495,902

[30] Foreign Application Priority Data
Aug. 16, 1973 Germany............................ 2341292

[52] U.S. Cl. ....................................... 8/93; 8/85 R; 8/88; 260/91.3 VA; 526/7; 526/11
[51] Int. Cl.² ................. C08F 116/06; C09B 67/00
[58] Field of Search.................... 8/93; 260/91.3 VA

[56] References Cited
UNITED STATES PATENTS

| | | |
|---|---|---|
| 1,768,795 | 3/1929 | Sheppard et al............ 260/91.3 VA |
| 1,845,452 | 2/1932 | Teller........................................ 8/93 |
| 2,155,658 | 4/1930 | Herrmann et al........... 260/91.3 VA |
| 2,265,283 | 12/1941 | Herrmann et al........... 260/91.3 VA |
| 2,643,211 | 6/1953 | Den Beste................................ 8/93 |
| 3,079,356 | 2/1963 | Oda et al. .................... 260/91.3 VA |
| 3,113,674 | 12/1963 | Kiefer et al.............................. 8/93 |
| 3,304,297 | 2/1967 | Wegmann et al........... 260/91.3 VA |
| 3,492,250 | 1/1970 | Deyrup ....................... 260/91.3 VA |

FOREIGN PATENTS OR APPLICATIONS 1,422,325 12/1965 France...................................... 8/93

OTHER PUBLICATIONS

Diserens, Dyeing & Printing, Reinhold, New York, (1948) pp. 7–22.

*Primary Examiner*—H.S. Cockeram
*Attorney, Agent, or Firm*—Plumley and Tyner

[57] ABSTRACT

Pulverulent or granular dyestuff preparations containing water-soluble dyestuffs and polyvinyl alcohol are suitable for the preparation of concentrated dyestuff solutions in water, water-soluble organic solvents or in mixtures thereof.

4 Claims, No Drawings

GRANULAR DYESTUFF PREPARATIONS BASED ON POLYVINYLALCOHOL AS THE CARRIER

The invention relates to pulverulent or granular preparations containing water-soluble dyestuffs and polyvinyl alcohol, processes for the production of these, and their use for the production of stable, non-gelling concentrated solutions, and in padding liquors, dye baths or printing pastes.

The dyestuff preparations can also contain further customary formulating agents such as dextrin, urea, sugars, sodium benzenesulphonate, inorganic salts such as sodium chloride, sodium sulphate, sodium carbonate and trisodium phosphate, anionic dispersing agents such as ligninsulphonic acids and their derivatives, condensation products of naphthalene, formaldehyde and sulphuric acid, condensation products of cresol, 2-naphthol-6-sulphonic acid and formaldehyde, alkylnaphthalenesulphonic acid, alkylsulphonic acids or their salts, non-ionic or cationic surface-active agents such as ethylene oxide adducts of long-chain alcohols or alkylphenols, derivatives of amines or ammonium salts, and anti-dusting agents such as oil or phthalic acid esters.

Examples of possible water-soluble dyestuffs are basic dyestuffs, acid dyestuffs, substantive dyestuffs, chrome dyestuffs, developing dyestuffs and mordant dyestuffs, premetallised dyestuffs and reactive dyestuffs. They can belong, for example, to the anthraquinone, azo, azomethine or nitro series. A large proportion of these dyestuffs is mentioned in the Colour Index part 1 - 3 and in Ulmann, Enzyklopaedie der organischen Chemie (Encyclopaedia of Organic Chemistry), volume 7, page 148 et seq., volume 4, page 76 et seq. and volume 3, page 662 et seq.

The polyvinyl alcohols employed are usually prepared by saponifying polyvinyl esters, for example polyvinyl acetate. Particularly suitable polyvinyl alcohols are those having a degree of saponification of 80 - 100 mol %, preferably 87 - 100 mol %, of which the 4% strength aqueous solutions have a viscosity of 2 - 80 cP, preferably 3 - 20 cP, at 20°C.

The dyestuff mixtures contain at least 5 per cent by weight of polyvinyl alcohol, relative to dyestuff, and preferably 10–100%.

The dyestuff preparations can be in the form of dry powders or granules or of concentrated solutions in water-soluble organic solvents, in water or in mixtures thereof. Examples of suitable water-soluble organic solvents are alcohols such as ethylene glycol or propylene glycol, polyglycols such as diethylene glycol or triethylene glycol, glycol ethers and polyglycol ethers, such as ethylene glycol monoethyl ether, propylene glycol monoethyl ether or diethylene glycol monoethyl ether, carboxylic acid amides such as formamide or dimethylformamide, nitriles such as acetonitrile or β-hydroxypropionitrile, alkanolamines such as ethanolamine and also N-methylpyrrolidone, butyrolactone, dioxane, tetrahydrofurfuryl alcohol, sulpholane, dimethylsulphoxide or pyridine.

The pulverulent dyestuff preparations are produced by homogeneous dry grinding of the water-soluble dyestuff and polyvinyl alcohol, which is preferably employed as a fine powder, optionally in the presence of customary formulating agents, anti-dusting agents and/or anionic, cationic or nonionic surface-active agents, or by mixing the finely ground components. Concentrated solutions of the water-soluble dyestuffs with polyvinyl alcohol are obtained when the powder preparation described above is dissolved in water or the organic, water-soluble solvent, or when the water-soluble dyestuff and polyvinyl alcohol are dissolved in optional sequence in the solvent or in water, optionally in the presence of customary formulating agents and/or of anionic, cationic or non-ionic surface-active agents and optionally an emulsifier. The preferred procedure is that the mixture is heated, whilst stirring, to a temperature of about 60° - 130°C, depending on the nature of the solvent, and is subsequently allowed to cool. The concentrated solutions contain 5 - 60% by weight of dyestuff, preferably 10 to 40% by weight.

The granular dyestuff preparations can be prepared by spray drying of the solutions or dispersions of the dyestuffs, containing polyvinyl alcohol.

Using the dyestuff preparations according to the invention, either in the form of pulverulent or granular formulations or in the form of concentrated solutions, it proves possible to prepare concentrated dyeing liquors, such as are demanded for modern dyeing methods. Dyeing liquors which do not contain any polyvinyl alcohol tend to gel on cooling and can therefore not be used for the preparation of concentrated dyeing liquors.

EXAMPLE 1

75 g of dry dyestuff of the following structure:

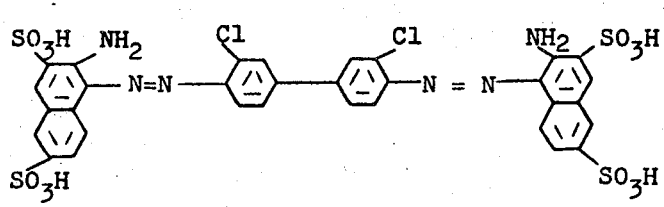

are mixed dry with 20 g of pulverulent polyvinyl alcohol and 5 g of sugar, and the mixture is finely ground.

The polyvinyl alcohol employed was prepared from polyvinyl acetate and has a degree of saponification (degree of hydrolysis) of 88 ± 0.8 mol %. The ester number is 140 ± 10 mg of KOH/g, the residual acetyl content is 10.7 ± 0.7% by weight and the viscosity of a 4% strength aqueous solution at 20°C is 4 ± 0.5 cP.

If 60 g of the dyestuff mixture described above are dissolved in 1 l of water at 90° - 100°C, the solution of the dyestuff on cooling gels only at approx. 26°C. If, on the other hand, 60 g of a mixture which was prepared from 75 g of the same dyestuff and 25 g of sugar under the same conditions are dissolved in 1 l of water at 90° - 100°C, the solution, on cooling, already gels at approx. 48°C.

EXAMPLE 2

40 g of dry dyestuff of the following structure:

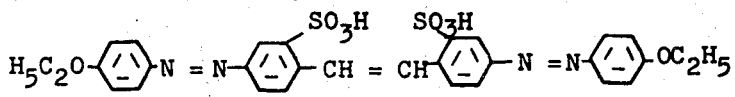

are mixed with 35 g of polyvinyl alcohol and 25 g of dextrin in the same manner as in Example 1. On dissolving in water the mixture shows a substantially lower tendency to gel than does a comparable mixture which contains dextrin instead of polyvinyl alcohol.

EXAMPLE 3

A mixture of 57 g of dyestuff of the following structure

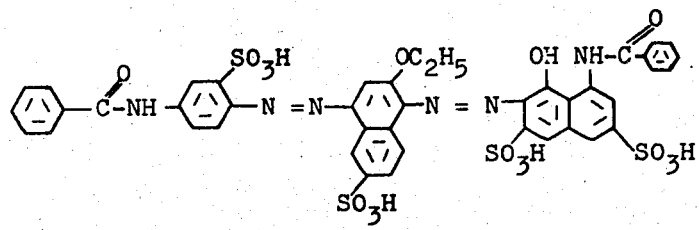

6 g of polyvinyl alcohol, 5.6 g of urea, 1.4 g of phthalic acid dimethyl ester and 30 g of dextrin is prepared as in Example 1.

If 30 g of this mixture are dissolved in 1 l of water at 90° – 100°C, the solution does not gel on cooling, even at room temperature.

EXAMPLE 4

A mixture of 80 g of the dyestuff of the formula

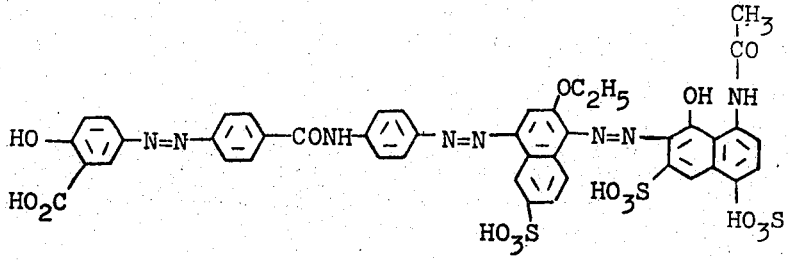

12 g of polyvinyl alcohol and 8 g of sodium hexametaphosphate is prepared as in Example 1.

A solution of 12 g of this mixture in 1 of water does not gel on cooling, even at room temperature.

EXAMPLE 5

A mixture of 72 g of dyestuff of the following structure

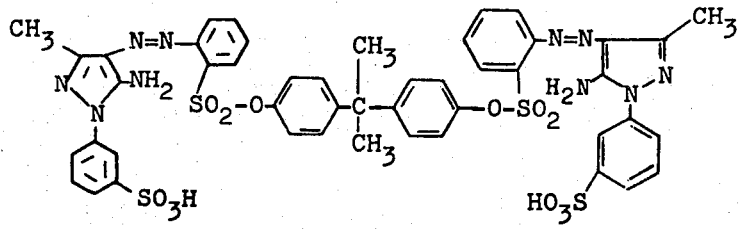

and 28 g of polyvinyl alcohol is prepared as in Example 1.

If 100 g of this mixture are dissolved in 1 l of water at 90° – 100°C, the solution does not gel on cooling to room temperature. If, on the other hand, 100 g of a dyestuff mixture which contains dextrin instead of polyvinyl alcohol are dissolved under the same conditions, the solution, on cooling, gels already at 35°C.

EXAMPLE 6

A mixture of 84 g of a dyestuff of the following structure

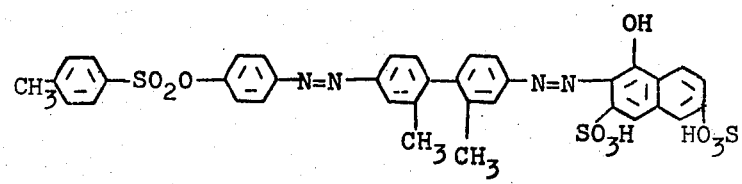

and 16 g of polyvinyl alcohol is prepared as in Example 1.

If 50 g of this mixture are dissolved in 1 l of water at 90° – 100°C, the solution remains clear on cooling, whilst a solution prepared under the same conditions, which contains dextrin or sodium sulphate instead of polyvinyl alcohol, precipitates on cooling.

EXAMPLE 7

A mixture of 73 g of a dyestuff of the following structure

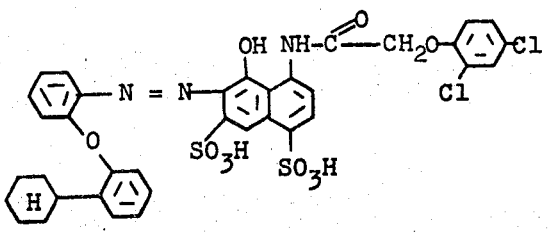

and 27 g of polyvinyl alcohol is prepared as in Example 1.

If 60 g of this mixture are dissolved in 1 l of water at 90° – 100°C, the solution does not gel on cooling to room temperature, whilst a solution of 60 g of an identical dyestuff mixture which, however, contains dextrin instead of polyvinyl alcohol, gels.

EXAMPLE 8

A mixture of 38 g of dyestuff of the following structure

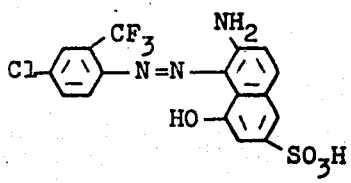

20 g of polyvinyl alcohol and 42 g of sugar is prepared as In Example 1.

50 g of this mixture dissolve in 1 l of water at 90° – 100°C and the solution does not gel on cooling, whilst the dyestuff mixture which contains 20 g of sugar instead of 20 g of polyvinyl alcohol does not dissolve completely under these conditions, and gels on cooling.

EXAMPLE 9

A dyestuff mixture is prepared as in Example 1. Instead of the polyvinyl alcohol mentioned in Example 1, a polyvinyl alcohol which has a degree of hydrolysis (degree of saponification) of 98.5 ± 0.5 mol %, an ester number of 20 ± 5 mg/KOH/g and a residual acetyl content of 1.5 ± 0.4% by weight is employed.

A solution of 60 g of this mixture in 1 l of water does not gel on cooling to room temperature.

EXAMPLE 10

A mixture of 31 g of the dyestuff of the formula

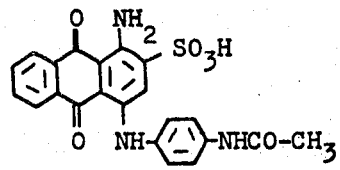

5 g sodium carbonate, 40 g of polyvinyl alcohol and 24 g of dextrin is prepared as in Example 1.

If 60 g of this mixture are dissolved in 1 l of water at 90° – 100°C, the solution gels on cooling to room temperature at approx. 26°C, whilst a solution of 60 g of an identical dyestuff mixture which, however, contains dextrin instead of polyvinyl alcohol, gels already at 36°C.

We claim:

1. A pulverulent or granular composition consisting essentially of
   a. a water-soluble dyestuff; and
   b. polyvinyl alcohol in the amount of from about 5% to about 100% by weight of said dyestuff.
2. The composition of claim 1 wherein said polyvinyl alcohol is present in the amount of from about 10% to about 100% by weight of said dyestuff.
3. A concentrated dyestuff solution which is substantially non-gelling above about 26°C consisting essentially of:
   a. water, or a water-soluble organic solvent or a mixture thereof;
   b. a water-soluble dyestuff in the amount of from about 5% to about 60% by weight of said solution; and
   c. polyvinyl alcohol in the amount of from about 5% to about 100% by weight of said dyestuff.
4. A process for the production of a concentrated dyestuff solution which is substantially non-gelling above about 26°C comprising dissolving a dry-pulverized dyestuff and polyvinyl alcohol in the amount of from about 5% to about 100% by weight of said dyestuff in a sufficient amount of water, water-soluble organic solvent or mixtures thereof to produce a solution containing from about 5% to about 60% by weight of said dyestuff.

* * * * *